United States Patent
Kim et al.

(10) Patent No.: US 8,638,359 B2
(45) Date of Patent: Jan. 28, 2014

(54) DISPLAY APPARATUS AND METHOD OF DRIVING THE SAME

(75) Inventors: Bo-Ram Kim, Asan-si (KR); Myoung-Chul Kim, Dongducheon-si (KR); Yun-Jae Kim, Asan-si (KR); Byoungjun Lee, Cheonan-si (KR); Nam-Hee Goo, Gunsan-si (KR); Seunghwan Moon, Asan-si (KR); HyunSeok Ko, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 881 days.

(21) Appl. No.: 12/731,701

(22) Filed: Mar. 25, 2010

(65) Prior Publication Data

US 2011/0090319 A1    Apr. 21, 2011

(30) Foreign Application Priority Data

Oct. 15, 2009    (KR) .......................... 10-2009-0098374

(51) Int. Cl.
*H04N 13/04*    (2006.01)

(52) U.S. Cl.
USPC ................ 348/51; 348/42; 345/419; 345/204

(58) Field of Classification Search
USPC ............................... 348/51, 42; 345/419, 204
See application file for complete search history.

(56) References Cited

U.S. PATENT DOCUMENTS

| | | | |
|---|---|---|---|
| 7,916,222 B2 * | 3/2011 | Jang et al. ...................... | 349/15 |
| 8,111,283 B2 * | 2/2012 | Kim et al. ....................... | 348/43 |
| 2007/0242068 A1 * | 10/2007 | Han et al. ...................... | 345/427 |
| 2008/0117231 A1 * | 5/2008 | Kimpe .......................... | 345/629 |
| 2010/0039503 A1 * | 2/2010 | Lin et al. ......................... | 348/51 |
| 2010/0045784 A1 * | 2/2010 | Okazaki et al. ................ | 348/55 |
| 2010/0188382 A1 * | 7/2010 | Chen et al. ..................... | 345/211 |

* cited by examiner

*Primary Examiner* — Christopher S Kelley
*Assistant Examiner* — Maria Vazquez Colon
(74) *Attorney, Agent, or Firm* — F. Chau & Associates, LLC

(57) ABSTRACT

In a display apparatus and a driving method thereof, a detector determines whether a timing controller is operated in a three-dimensional (3D) mode or a two-dimensional (2D) mode to output a first or second mode signal according to a result of the determination. A compensator compensates for a gamma value of a 3D image to be increased in response to a first mode signal when the 2D mode is converted to the 3D mode and decreases an increased gamma value to a gamma value for a 2D image in response to a second mode signal when the 3D mode is converted to the 2D mode.

15 Claims, 15 Drawing Sheets

DISPLAY APPARATUS AND METHOD OF DRIVING THE SAME

CROSS-REFERENCE TO RELATED APPLICATION

This application claims priority to Korean Patent Application No. 10-2009-0098374 filed on Oct. 15, 2009, the contents of which are herein incorporated by reference in their entirety.

BACKGROUND

1. Field of the Invention

The present invention relates to a display apparatus and a method of driving the same. More particularly, the present invention relates to a display apparatus for displaying a three-dimensional image and a method of driving the display apparatus.

2. Description of Related Art

A three-dimensional image display apparatus alternately displays images having two different perspectives, referred to hereinafter as a left-eye image and a right-eye image, on a display panel in order to create the illusion of a three-dimensional image. When the image displayed on the display panel is changed from a first perspective image, e.g., the left-eye image, to a second perspective image, e.g., the right-eye image, or vice versa, the left-eye image and the right-eye image may be mixed with each other due to a scanning method of the display panel, thereby causing deterioration in display quality.

Therefore, a need exists for a method of increasing a response speed of liquid crystal molecules and decreasing the mixing of the left-eye image and the right-eye image in a three-dimensional image display apparatus.

SUMMARY

According to embodiments of the present invention, a display apparatus includes a timing controller, a data driver, a detector, and a display panel.

The timing controller receives a first image signal of a first perspective and a second image signal of a second perspective from an exterior in synchronization with a first control signal during a 3D mode and receives a 2D image signal from the exterior in synchronization with a second control signal during a 2D mode.

The data driver converts the first image signal to a first data voltage and the second image signal to a second data voltage to alternately output the first and second data voltages in one frame unit during the 3D mode and converts the 2D image signal to a third data voltage to output the third data voltage in one frame unit during the 2D mode.

The detector determines whether the timing controller is operated in the 3D mode or the 2D mode based on the first and second control signals and outputs a first mode signal or a second mode signal to the timing controller according to a result of the determination.

The display panel alternately displays an image of the first image signal corresponding to the first data voltage and an image of the second image signal corresponding to the second data voltage in one frame unit during the 3D mode and displays a 2D image corresponding to the third data voltage during the 2D mode.

According to embodiments of the present invention, a display apparatus includes a timing controller, a data driver, a display panel, and a compensator.

The timing controller outputs a first image signal for a left-eye perspective and a second image signal for a right-eye perspective during a 3D mode and outputs a 2D image signal during a 2D mode.

The data driver converts the first image signal to a first data voltage and the second image signal to a second data voltage to alternately output the first and second data voltages in one frame unit during the 3D mode and converts the 2D image signal to a data voltage to output the data voltage in one frame unit during the 2D mode.

The display panel alternately displays a left-eye image of the first image signal corresponding to the first data voltage and a right-eye image of the second image signal corresponding to the second data voltage in one frame unit during the 3D mode and displays a 2D image corresponding to the data voltage during the 2D mode.

The compensator compensates for a gamma value of the left-eye image and the right-eye image to be increased when the 2D mode is converted to the 3D mode and compensates for an increased gamma value to be decreased to the gamma value of the 2D image when the 3D mode is converted to the 2D mode.

According to embodiments of the present invention, a method of driving a display apparatus includes receiving a first image signal of a first perspective and a second image signal of a second perspective in synchronization with a first control signal are received during a 3D mode and a 2D image signal in synchronization with a second control signal is received during a 2D mode.

A 3D mode signal or a 2D mode signal is generated based on the first and second control signals. A gamma value of the first and second image signals is compensated in response to the 3D mode signal such that the gamma value is increased. The compensated first image signal and the compensated second image signals are converted to a first data voltage and a second data voltage, respectively, and the first and second data voltages are alternately output in one frame unit.

Thus, a left-eye image of the first image signal corresponding to the first data voltage and a right-eye image of the second image signal corresponding to the second data voltage are alternately displayed in one frame unit during the 3D mode.

An increased gamma value is decreased to a gamma value corresponding to the 2D image signal in response to the 2D mode signal. The 2D image signal is converted to a data voltage in one frame unit, so that a 2D image corresponding to the data voltage is displayed during the 2D mode.

According to an exemplary embodiment of the present invention, the mode signals are generated according to whether the display apparatus is operated in the 3D mode or the 2D mode. When the display apparatus is operated in the 3D mode, a frame change rate in each pixel of the display apparatus is compensated such that the gamma value of the 3D image is shifted upward, e.g., increased, and when the display apparatus is operated in the 2D mode, the increased gamma value is decreased to a normal gamma value. Accordingly, the display apparatus operated in the 3D mode or the 2D mode may substantially prevent deterioration in image quality when the 2D or 3D mode is converted.

BRIEF DESCRIPTION OF THE DRAWINGS

The present invention will become readily apparent by reference to the following detailed description when considered in conjunction with the accompanying drawings wherein.

DETAILED DESCRIPTION OF EXEMPLARY EMBODIMENTS

According to an exemplary embodiment of the present invention, a response speed of liquid crystal molecules may be increased and mixing of the left-eye image and the right-eye image decreased in a three-dimensional image display apparatus employing a driving method that corrects a present image using a correction voltage in consideration of a target voltage of the present image and a driving voltage of a previous image. Thus, the three-dimensional image display apparatus includes a memory to store the driving voltage of the previous image among the left-eye image and the right-eye image.

Figure 1:
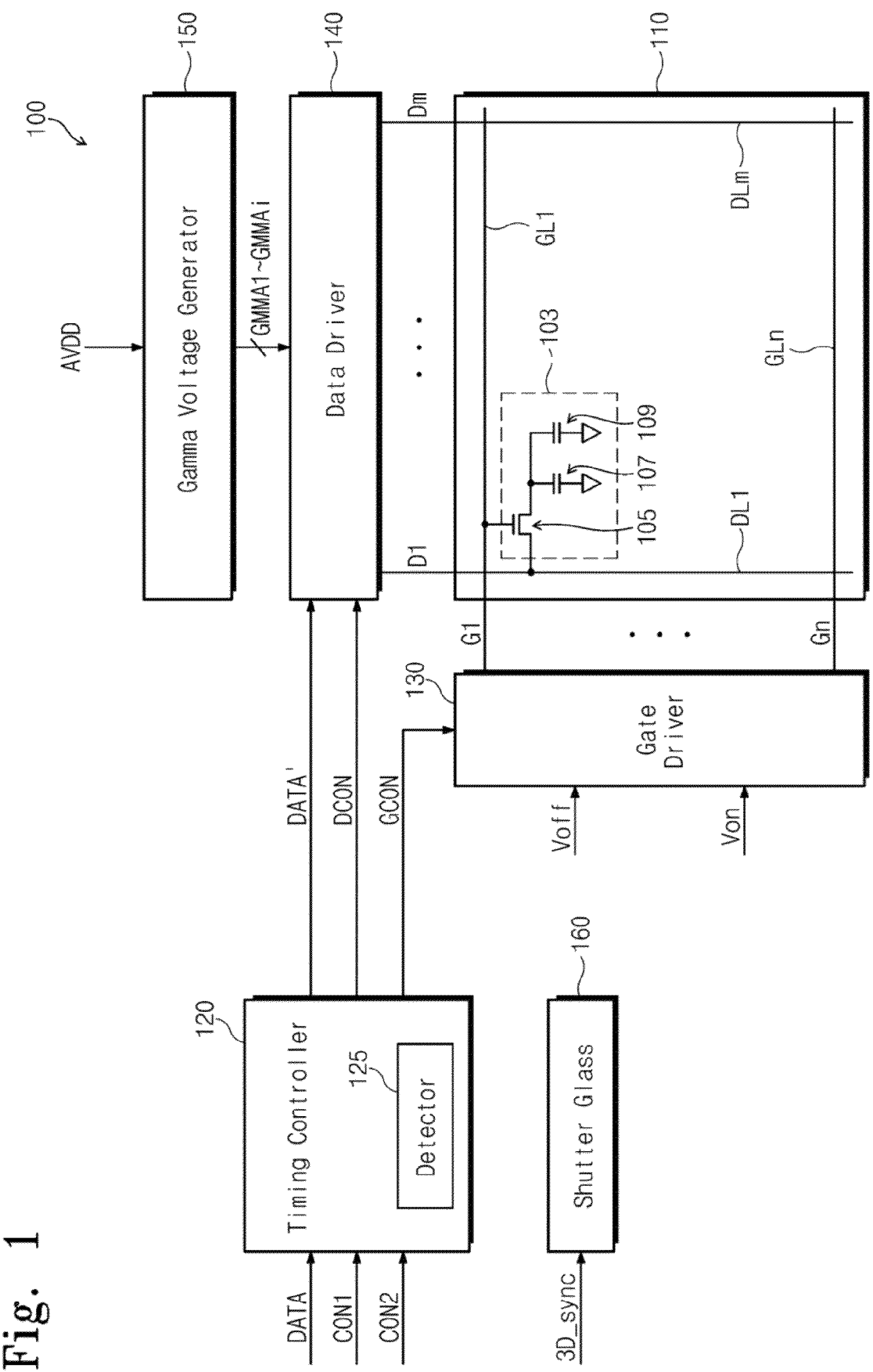
FIG. 1 is a block diagram showing a display apparatus according to an exemplary embodiment of the present invention.

FIG. 1 is a block diagram showing a display apparatus according to an exemplary embodiment of the present invention.

Referring to FIG. 1, a display apparatus 100 includes a display panel 110, a timing controller 120, a gate driver 130, a data driver 140, a gamma voltage generator 150, and a shutter glass 160.

The display panel 110 includes a plurality of pixels 103 to display an image. The display panel 110 further includes gate lines GL1~GLn and data lines DL1~DLm to provide signals to the pixels 103. Gate signals G1~Gn are sequentially provided to the gate lines GL1~GLn and data voltages D1~Dm are provided to the data lines DL1~DLm. Accordingly, when a pixel row is turned on, the data voltages D1~Dm are applied to the pixels corresponding to the turned-on pixel row. That is, the pixels 103 may be scanned individually in a row unit. When the pixels 103 are scanned completely, an image corresponding to one frame is displayed on the display panel 110.

For example, each of the pixels 103 may include a thin film transistor 105 connected to a corresponding gate line and a corresponding data line, a liquid crystal capacitor 107 connected to a drain electrode of the thin film transistor 105, and a storage capacitor 109 connected to the liquid crystal capacitor 107 in parallel. It is to be understood that the circuit configuration of each pixel 103 is not limited thereto or thereby.

The timing controller 120 receives plural image signals DATA from an external device (not shown). The image signals DATA may be two-dimensional (2D) image signals or three-dimensional (3D) image signals. In other words, if the display apparatus 100 is operated in a 3D mode, the timing controller 120 receives the image signals DATA corresponding to the 3D image, and if the display apparatus 100 is operated in a 2D mode, the timing controller 120 receives the image signals DATA corresponding to the 2D image.

In addition, if the display apparatus 100 is operated in the 3D mode, the timing controller 120 receives a first control signal CON1, and if the display apparatus 100 is operated in the 2D mode, the timing controller 120 receives a second control signal CON2. Each of the first and second control signals CON1 and CON2 may include a horizontal synchronization signal, a vertical synchronization signal, a main clock signal, and a data enable signal.

The timing controller 120 converts a data format of the image signals DATA into a data format appropriate to an interface between the timing controller 120 and the data driver 140 and outputs the converted image signals DATA' to the data driver 140. In addition, the timing controller 120 provides a data control signal DCON such as output start signal, horizontal start signal, horizontal clock signal, and polarity inverse signal to the data driver 140, and provides a gate control signal GCON such as vertical start signal, vertical clock signal, and vertical clock bar signal to the gate driver 130.

The gate driver 130 receives a gate driving voltage Von and a gate off voltage Voff and sequentially outputs the gate signals G1~Gn swinging between the gate driving voltage Von and the gate off voltage Voff in response to the gate control signal GCON provided from the timing controller 120. Thus, the pixels 103 arranged in the display panel 110 may be scanned sequentially by the gate signals G1~Gn in a row unit.

Responsive to the data control signal DCON provided from the timing controller 120, the data driver 140 selects voltages corresponding to the image signals DATA' among a plurality of gamma reference voltages GMMA1~GMMAi and outputs the selected voltages as the data voltages D1~Dm. The data voltages D1~Dm output from the data driver 140 are applied to the display panel 110.

The gamma reference voltage generator 150 receives an analog driving voltage AVDD to generate the gamma reference voltages GMMA1~GMMAi and provides the gamma reference voltages GMMA1~GMMAi to the data driver 140. The gamma voltage generator 150 has a resistor string structure in which resistors are connected in series between the analog driving voltage AVDD and a ground voltage. The gamma voltage generator 150 outputs potentials at nodes disposed between pairs of adjacent resistors, wherein the potentials are the gamma reference voltages GMMA1~GMMAi.

The shutter glass 160 is used when the display apparatus 100 is operated in the 3D mode.

Figure 2:
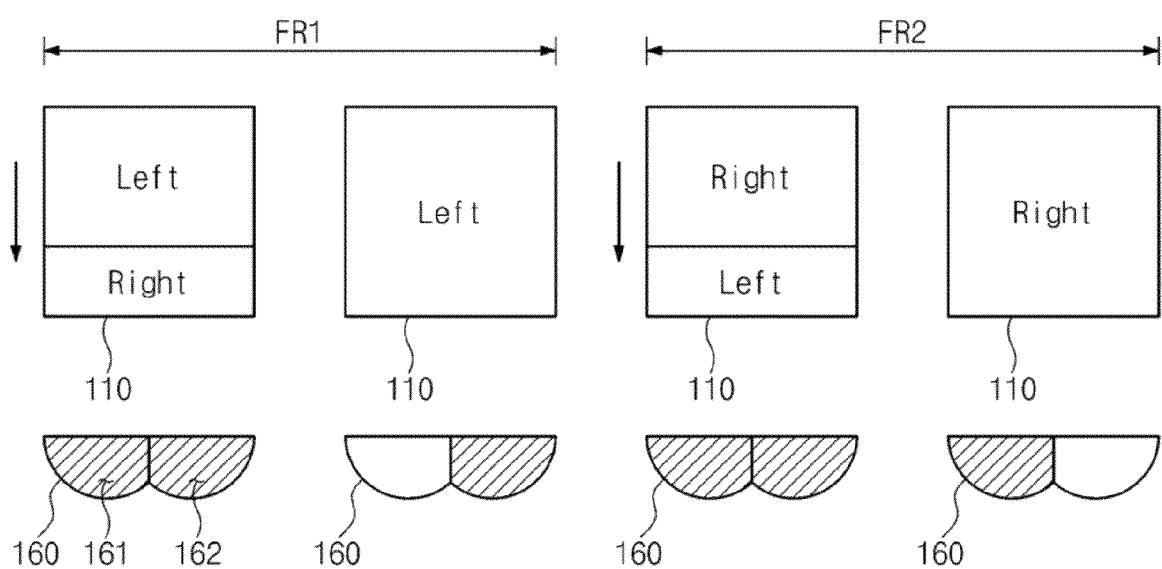
FIG. 2 is a view showing an operation of a shutter glass of FIG. 1.

FIG. 2 is a view showing an operation of a shutter glass of FIG. 1.

Referring to FIGS. 1 and 2, the shutter glass 160 includes a left-eye shutter 161 and a right-eye shutter 162. The shutter glass 160 receives a 3D synchronization signal 3D_Sync and controls an open and close operation of the left-eye shutter 161 and the right-eye shutter 162 in response to the 3D synchronization signal 3D_Sync. According to an exemplary embodiment, the 3D synchronization signal 3D_Sync may be one of signals included in the first control signal CON1 applied to the timing controller 120.

For the 3D mode of the display apparatus 100, the display apparatus 100 receives an image signal for a left-eye (hereinafter, referred to as a first image signal) and an image signal for a right-eye (hereinafter, referred to as a second image signal) in one frame unit. The left-eye signal and right-eye signal have a first and a second perspective, respectively.

While the first image signal is sequentially scanned in a first frame FR1, the left-eye shutter 161 and the right-eye shutter 162 of the shutter glass 160 are maintained in a close state. Once the first image signal is completely scanned, the left-eye shutter 161 is opened and the right-eye shutter 162 is maintained in the close state to allow the user to perceive the first image signal as the image signal for the left-eye.

Next, when starting the scan of the second image signal in the second frame FR2, the left-eye shutter 161 and the right-eye shutter 162 are closed again. Once the second image signal is completely scanned, the light-eye shutter 162 is opened and the left-eye shutter 161 is maintained in the close state to allow the user to perceive the second image signal as the image signal for the right-eye.

As described above, the display panel 110 alternately displays the left-eye image and the right-eye image by the frame unit while the shutter glass 160 controls the open and close operation of the left-eye shutter 161 and the right-eye shutter 162 in response to the 3D synchronization signal 3D_Sync. As a result, the user may perceive the image displayed on the display panel 110 as the 3D image.

In addition, if the display apparatus 100 is operated in the 3D mode, a time period (e.g., a time period during which the user perceives the scanned image) is required in which the image signal is scanned, and to alternately open the left-eye shutter 161 and the right-eye shutter 162 of the shutter glass 160.

Figure 3:
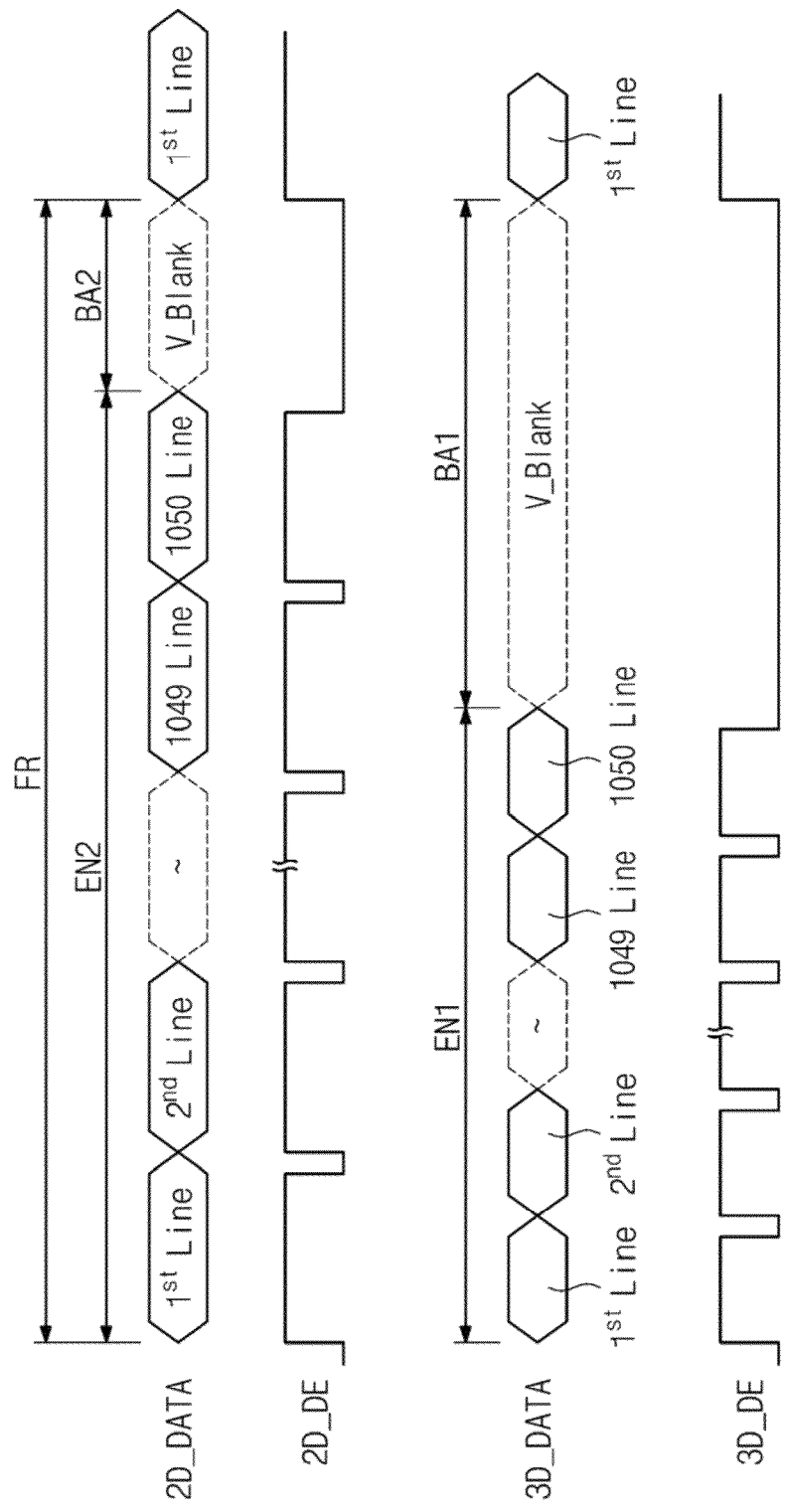
FIG. 3 is a waveforms diagram showing one period of two-dimensional mode and one operation of three-dimensional mode.

FIG. 3 is a waveforms diagram showing one period of 2D mode and one operation of 3D mode.

Referring to FIG. 3, one frame period FR is divided into a first enable period EN1 and a first blank period BA1 in the 3D mode. The left-eye and right-eye image signals 3D_DATA are scanned during the first enable period EN1. The left-eye and right-eye shutters 161 and 162 of the shutter glass 160 are closed during the first enable period EN1. For example, if the display panel 110 includes 1050 gate lines, the image signals 3D_DATA may be output over 1050 times during the first enable period EN1.

The first blank period BA1 is a period during which the image signals 3D_DATA are not output to the display panel 110. The left-eye and right-eye shutters 161 and 162 of the shutter glass 160 are opened during the first blank period BA1.

Meanwhile, one frame period FR is divided into a second enable period EN2 and a second blank period BA2 in the 2D mode. The 2D image signals 2D_DATA are scanned during the second enable period EN2. The second blank period BA2 is a period during which the image signals 2D_DATA are not output to the display panel 110.

In order to ensure a period during which the shutter glass 160 is opened, the first blank period BA1 has a length longer than that of the second blank period BA2 in the 3D mode. The one frame period FR has a constant time interval according to a driving frequency of the display apparatus 100. For example, if the display apparatus 100 is operated in a driving frequency of about 120 Hz, the one frame period FR may be set to about 8.3 ms. Accordingly, if the first blank period BA1 becomes longer in one frame period, the first enable period EN1 becomes shorter.

In the 3D mode, the timing controller 120 receives the left-eye or right-eye image signal 3D_DATA in response to a 3D data enable signal (hereinafter, referred to as a first enable signal) 3D_DE. In addition, the timing controller 120 receives the 2D image signals 2D_DATA in response to a 2D data enable signal (hereinafter, referred to as a second enable signal) 2D_DE.

As shown in FIG. 3, the first enable signal 3D_DE is alternately switched between a logic high state and a logic low state during the first enable period EN1 and is maintained in the logic low state during the first blank period BA1. Similarly, the second enable signal 2D_DE is alternately switched between the logic high state and the logic low state during the second enable period EN2 and is maintained in the logic low state during the second blank period BA2.

Since the length of the first enable period EN1 decreases as the length of the first blank period BA1 increases, the length of the high period of the first enable signal 3D_DE becomes shorter than the length of the high period of the second enable signal 2D_DE.

When the length of the high period of the first enable signal 3D_DE becomes shorter, a time period during which the image signals are provided to the pixel row connected to each gate line is shortened. In other words, if the display apparatus 100 is operated in the 3D mode, the frame change rate of each pixel may be reduced compared with when the display apparatus 100 is operated in the 2D mode. A method of compensating for the frame change rate of the 3D mode will be described in detail with reference to FIGS. 7 to 14.

Figure 4:
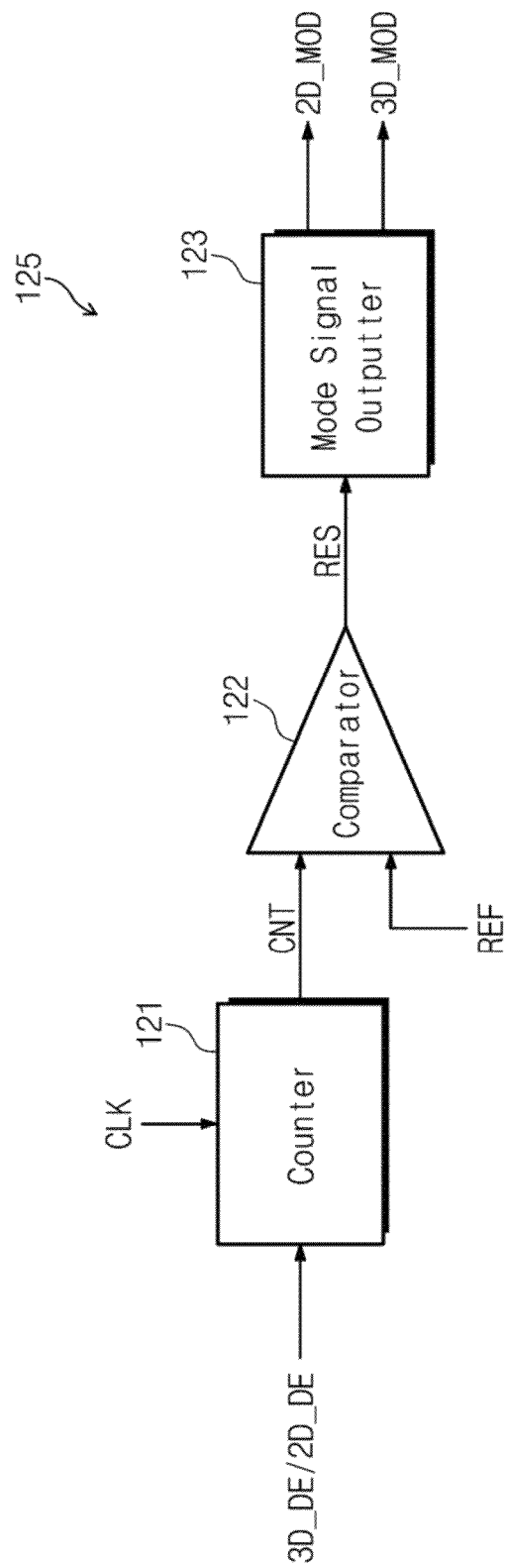
FIG. 4 is a block diagram showing a detector of FIG. 1.
Figure 5:
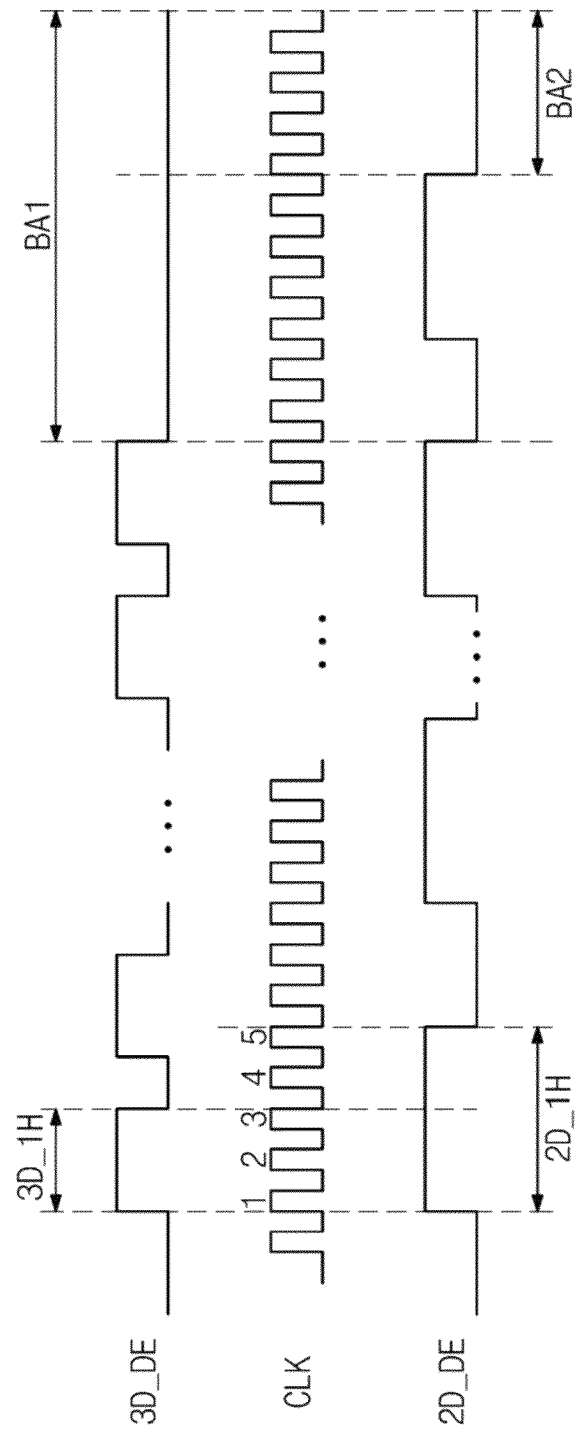
FIG. 5 is a timing diagram illustrating an exemplary embodiment of a detecting method of the detector of FIG. 4.

FIG. 4 is a block diagram showing a detector of FIG. 1, and FIG. 5 is a timing diagram illustrating an exemplary embodiment of a detecting method of the detector of FIG. 4.

Referring to FIGS. 1 and 4, the display apparatus 100 includes a detector 125 to check whether the timing controller 120 receives the 3D image signals or the 2D image signals. According to an exemplary embodiment, the detector 125 is installed inside the timing controller 120 while the detector 125 is installed outside the timing controller 120.

The detector 125 may include a counter 121, a comparator 122, and a mode signal outputter 123. According to an exemplary embodiment, the detector 125 may check whether the display apparatus 100 is operated in the 3D mode or the 2D mode using the first and second enable signals 3D_DE and 2D_DE. However, the detector 125 may use various signals other than the first and second enable signals 3D_DE and 2D_DE.

If the display apparatus 100 is operated in the 3D mode, the timing controller 120 receives the first enable signal 3D_DE from the exterior. In this case, the counter 121 of the detector 125 receives the first enable signal 3D_DE from the timing controller 120.

If the display apparatus 100 is operated in the 2D mode, the timing controller 120 receives the second enable signal 2D_DE from the exterior. In this case, the counter 121 of the detector 125 receives the second enable signal 2D_DE from the timing controller 120.

The counter 121 counts the first or second enable signal 3D_DE or 2D_DE by using a predetermined reference clock (e.g., oscillator clock) CLK.

According to an exemplary embodiment, the counter 121 may count the high period of the first or second enable signal 3D_DE or 2D_DE by using the reference clock CLK.

As shown in FIG. 5, the counter 121 counts the high period 3D_1H of the first enable signal 3D_DE using the reference clock CLK during the 3D mode. The counter 121 may output a count value CNT of 3 as the counted result. In a case where the counter 121 counts the high period 2D_1H of the second enable signal 2D_DE using the reference clock CLK during the 2D mode, the counter 121 may output the count value CNT of 5. That is, since the high period 2D_1H of the second enable signal 2D_DE is longer than the high period 3D_1H of the first enable signal 3D_DE, the counter 121 may output the count value CNT during the 2D mode, which is larger than the count value CNT during the 3D mode.

The count value CNT is provided to the comparator 122 and compared with a predetermined reference value REF. The comparator 122 outputs a result value RES of the comparison. The mode signal outputter 123 outputs either a first mode signal 3D_MOD or a second mode signal 2D_MOD according to the result value RES. For example, if the count value CNT is smaller than the reference value REF, the mode signal outputter 123 outputs the first mode signal 3D_MOD, and if the count value CNT is equal to or larger than the reference value REF, the mode signal outputter 123 outputs the second mode signal 2D_MOD.

According to another exemplary embodiment, the counter 121 may count the first blank period BA1 of the first enable signal 3D_EN using a reference clock defined by one high period 3D_1H and one low period of the first enable signal 3D_EN generated in the first enable period EN1. In addition, the counter 121 may count the second blank period BA2 of the second enable signal 2D_EN using a reference clock defined by one high period 2D_1H and one low period of the second enable signal 2D_EN generated in the second enable period EN2.

The first blank period BA1 has the length longer than the length of the second blank period BA2 and the high period 2D_1H of the second enable signal 2D_DE is longer than the high period 3D_1H of the first enable signal 3D_EN, and thus the count value of the second 2D mode is smaller than the count value of the 3D mode.

The count value CNT is provided to the comparator 122 and compared with the reference value REF. The comparator 122 outputs the result value RES according to the compared result. The mode signal outputter 123 outputs the first mode signal 3D_MOD or the second mode signal 2D_MOD according to the result value RES. For example, if the count value CNT is equal to or larger than the reference value REF, the mode signal outputter 123 outputs the first mode signal 3D_MOD, and if the count value CNT is smaller than the reference value REF, the mode signal outputter 123 outputs the second mode signal 2D_MOD.

Figure 6:
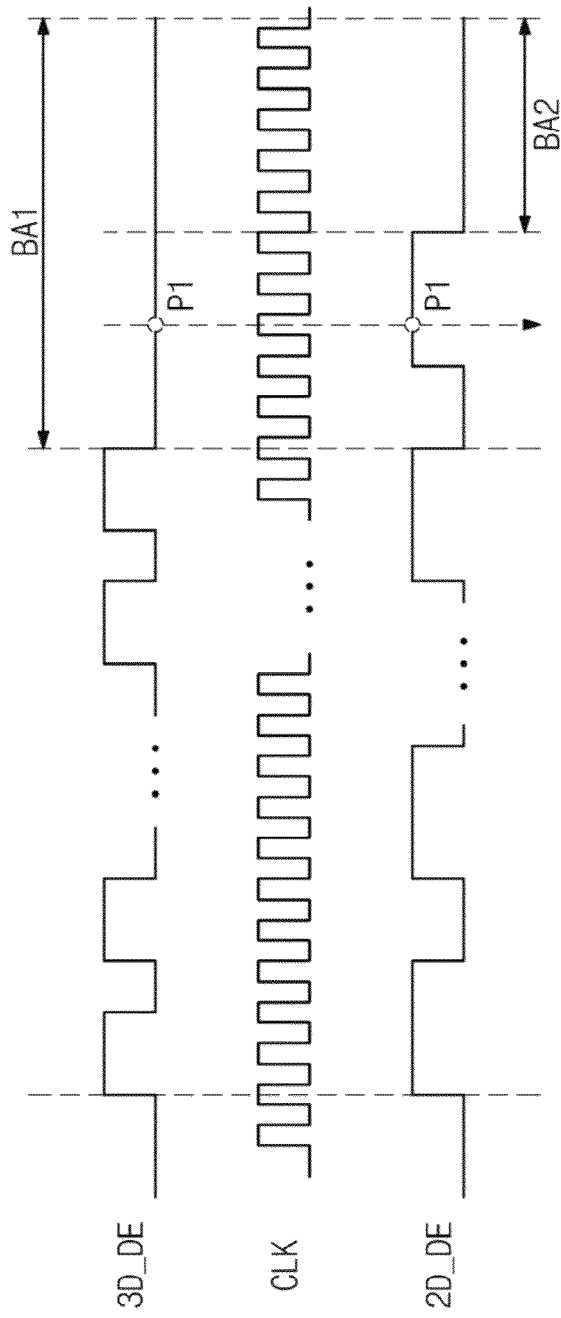
FIG. 6 is a timing diagram illustrating another exemplary embodiment of a detecting method of the detector of FIG. 4.

FIG. 6 is a timing diagram illustrating another exemplary embodiment of a detecting method of the detector of FIG. 4.

Referring to FIG. 6, the counter 121 counts a reference clock CLK from a time point at which a frame starts to output a count value CNT. That is, the counter 121 counts the reference clock CLK from a starting time point of the first enable signal 3D_DE to a specific time point P1 of the first enable signal 3D_DE in the 3D mode.

The comparator 122 compares the count value CNT with a predetermined reference value REF and checks whether the first enable signal 3D_DE is in a logic high state when the count value CNT is in accord with the reference value REF. When the first enable signal 3D_DE is in a logic low state, the mode signal outputter 123 recognizes the 3D mode and outputs the first mode signal 3D_MOD.

Meanwhile, the counter 121 counts the reference clock CLK from the starting time point of the first enable signal 3D_DE to the specific time point P1 of the second enable signal 2D_DE in the 2D mode.

The comparator 122 compares the count value CNT with a predetermined reference value REF and checks whether the second enable signal 2D_DE is in the logic high state when the count value CNT is in accord with the reference value REF. When the second enable signal 2D_DE is in the logic low state, the mode signal outputter 123 recognizes the 2D mode and outputs the second mode signal 2D_MOD.

Although not shown in figures, the detector 125 may check whether the timing controller 120 receives the image signal for the 2D mode or the image signal for the 3D mode by using any signal included in the first and second control signals CON1 and CON2.

Figure 7:
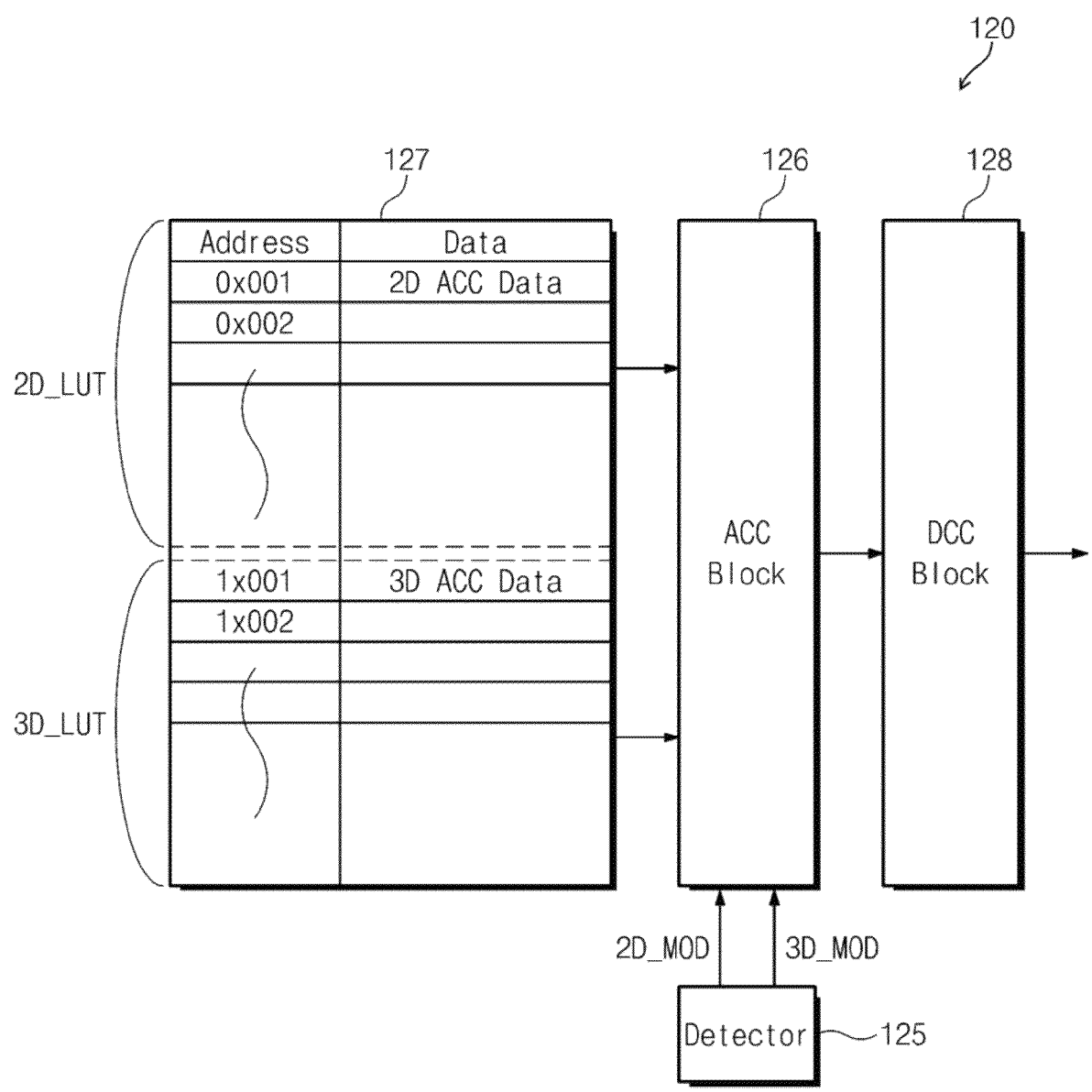
FIG. 7 is a block diagram showing a timing controller of FIG. 1.
Figure 8:
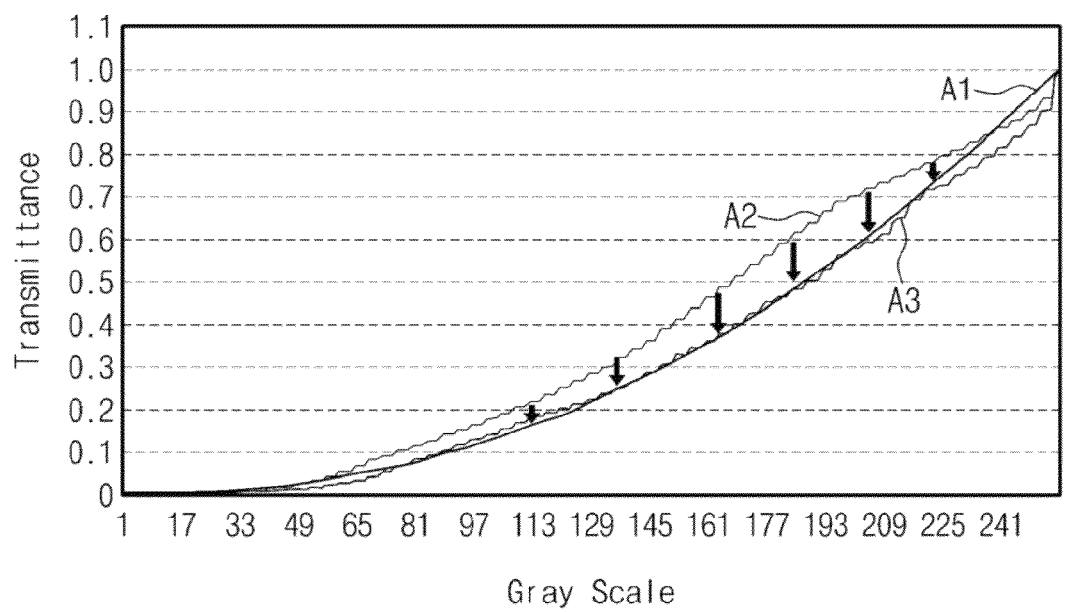
FIG. 8 is a graph showing a gamma curve.

FIG. 7 is a block diagram showing a timing controller of FIG. 1, and FIG. 8 is a graph showing a gamma curve. In FIG. 8, an x-axis denotes a gray scale, a y-axis denotes a transmittance, and the transmittance is a conversion value when assuming that a maximum transmittance of about 100% is referred to as 1. In FIG. 8, a first graph A1 shows a 2.2 gamma curve, a second graph A2 shows a conventional gamma curve for a 3D mode, and a third graph A3 shows a gamma curve for a 3D mode according to an exemplary embodiment.

Referring to FIG. 7, the timing controller 120 includes an accurate color capture block (hereinafter, referred to as ACC) 126, a dynamic capacitance capture block (hereinafter, referred to as DCC) 128, and an electrically erasable programmable read only memory (hereinafter, referred to as EEPROM) 127.

The ACC block 126 gamma-compensates for red, green, and blue data included in the image signals based on a predetermined compensation value according to gamma characteristics of the display apparatus 100 and outputs the compensated red, green, and blue data. That is, the display apparatus 100 has different brightness with respect to the red, green, and blue data having the same gray scale since the red, green, and blue gamma characteristics in the display apparatus 100 are different from each other. For example, the brightness of the blue data is highest, the brightness of the red data is lowest, and the brightness of the green data is intermediate between the blue data and the red data.

In order to compensate for the brightness difference, the ACC block 126 sets a reference gamma characteristic (e.g., 2.2 gamma) and sets a difference between the reference gamma characteristic and each of the red, green, and blue gamma characteristics as the compensation value. Thus, the ACC block 126 adds or subtracts the compensation value to or from the red, green, and blue data to compensate for the brightness difference.

The compensation value is predetermined according to the gray scales of the image signals and stored in a look-up table. According to the present exemplary embodiment, the EEPROM 127 may include a first look-up table 3D_LUT in which 3D-ACC data (hereinafter, referred to as a first compensation value) are stored and a second look-up table 2D_LUT in which 2D-ACC data (hereinafter, referred to as a second compensation value) are stored. Under the same gray scale, the first compensation value may be greater than the second compensation value.

Accordingly, when the ACC block 126 receives the first mode signal 3D_MOD from the detector 125, the ACC block 126 compensates for the 3D image signals with reference to the first look-up table 3D_LUT, and when the ACC block 126 receives the second mode signal 2D_MOD from the detector 125, the ACC block 126 compensates for the 2D image signals with reference to the second look-up table 2D_LUT.

As shown in FIG. 8, the second graph A2 is positioned above the first graph A1 due to the reduction of the frame change rate of each pixel, and thus the second graph A2 has the gamma value lower than the 2.2 gamma value. However, if the ACC compensation is performed using the first compensation value higher than the second compensation value of the 2D mode during the 3D mode, the third graph A3 moves close to the first graph A1. That is, when the ACC compensation is performed using the first compensation value in the 3D mode, the gamma value for the 3D image signals is shifted upward, e.g., increased.

Meanwhile, in case of the 2D mode, the ACC block 126 compensates for the 2D image signals using the second compensation value of the 2D mode. Thus, the increased gamma value during the 3D mode may be reduced to a normal gamma value (e.g., 2.2 gamma value) during the 2D mode.

Referring to FIG. 7 again, the DCC block 128 compensates for a gray scale value of a present image signal based on the compensation value predetermined according to the gray scale difference between the present, image signal and a previous image signal to improve a response speed of a present frame. In other words, the DCC block 128 increases the gray scale value of the present image signal above a target gray scale. To this end, the timing controller 120 may further include a frame memory (not shown) to store the image signals in one frame.

Figure 9:
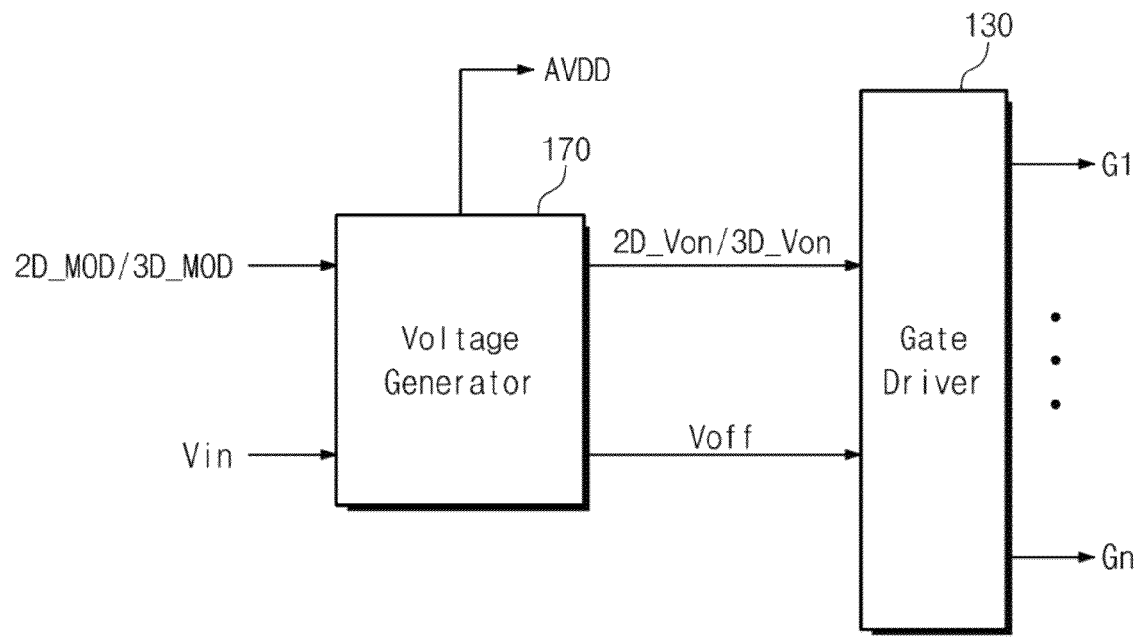
FIG. 9 is a block diagram showing a gate driver and a voltage generator of FIG. 1.
Figure 10A:
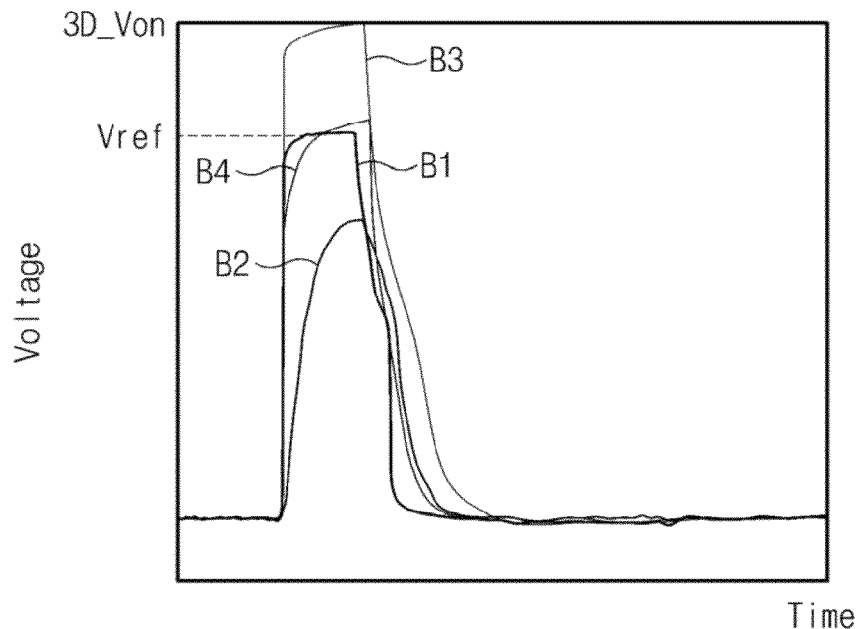
FIG. 10A is a waveforms diagram showing a gate signal according to a time sequence in a three-dimensional mode.
Figure 10B:
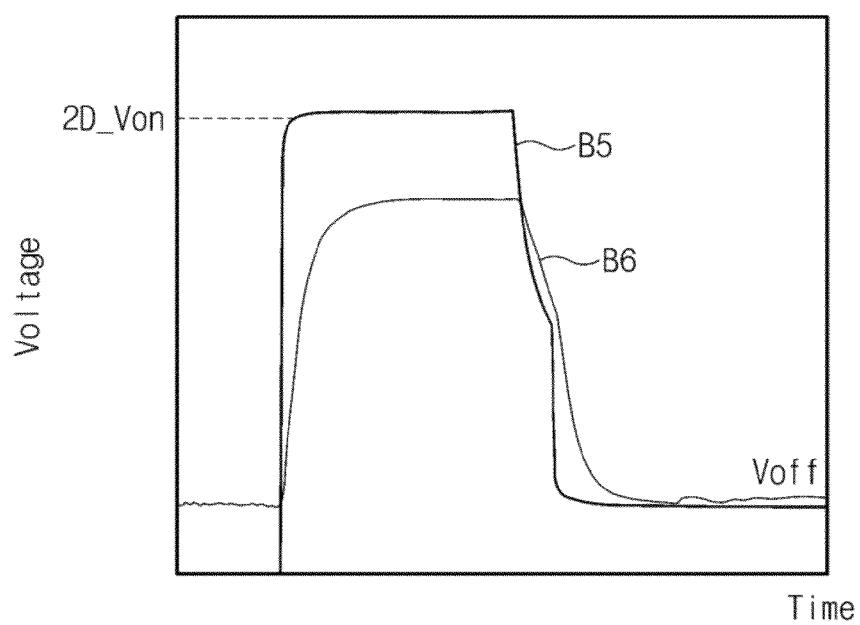
FIG. 10B is a waveforms diagram showing a gate signal according to a time sequence in a two-dimensional mode.

FIG. 9 is a block diagram showing a gate driver and a voltage generator of FIG. 1, FIG. 10A is a waveforms diagram showing a gate signal according to a time sequence in a three-dimensional mode, and FIG. 10B is a waveforms diagram showing a gate signal according to a time sequence in a two-dimensional mode.

Referring to FIG. 9, the gate driver 130 receives the gate driving voltage Von and the gate off voltage Voff and sequentially outputs the gate signals G1~Gn swinging between the gate driving voltage Von and the gate off voltage Voff.

The voltage generator 170 receives an input voltage Vin and the first mode signal 3D_MOD or the second mode signal 2D_MOD from the detector 125 shown in FIG. 1. For example, the voltage generator 170 increases the gate driving voltage Von above a predetermined reference voltage in response to the first mode signal 3D_MOD during the 3D mode to output a 3D gate driving voltage 3D_Von. In addition, the voltage generator 170 decreases the 3D gate driving voltage 3D_Von to the predetermined reference voltage in response to the second mode signal 2D_MOD during the 2D mode to output a 2D gate driving voltage 2D_Von.

For example, when assuming that the reference voltage is set to about 20 volts, the 3D gate driving voltage 3D_Von may be increased to 22 volts, 24 volts, 26 volts, or 28 volts.

Hereinafter, the response speed of the gate signals G1~Gn will be described by assuming that a side to which the gate signals G1~Gn are input is a left side of the display apparatus 110 and a side opposite to the left side is a right side of the display apparatus 110. In this case, the gate driver 130 is positioned adjacent to the left side of the display apparatus 110.

In FIG. 10A, B1 shows a wavelength of a gate signal measured at the left side of the display panel when applying the reference voltage Vref in a conventional 3D mode, and B2 shows a wavelength of a gate signal measured at the right side of the display panel when applying the reference voltage Vref in a conventional 3D mode. In addition, B3 shows a wavelength of a gate signal measured at the left side of the display panel when applying the 3D gate driving voltage 3D_Von higher than the reference voltage Vref in the 3D mode according to an exemplary embodiment, and B4 shows a wavelength of a gate signal measured at the right side of the display panel when applying the 3D gate driving voltage 3D_Von in the 3D mode according to an exemplary embodiment.

Referring to FIG. 10A, the response speed of the gate signals G1~Gn increases when the 3D gate driving voltage 3D_Von is applied to the gate driver 130 as compared to when the reference voltage Vref is applied to the gate driver 130. In addition, the delay time of the gate signals G1~Gn is decreased as compared to that in the conventional 3D mode. As described above, when the 3D gate driving voltage 3D_Von increases above the reference voltage Vref, the delay time of the gate signals G1~Gn may be compensated, thereby improving the frame change rate of each pixel.

In addition, the frame change rate of the pixels positioned at the right side of the display panel 110 may be improved according to the increase of the gate driving voltage Von, to thereby substantially prevent deterioration of display quality due to the difference of the frame change rate between the right and left sides of the display panel 110.

In FIG. 10B, B5 shows a wavelength of a gate signal measured at the left side of the display panel when applying the 2D gate driving voltage 2D_Von in the 2D mode, and B6 shows a wavelength of a gate signal measured at the right side of the display panel when applying the 2D driving voltage 2D_Von in the 2D mode.

Referring to FIG. 10B, the 3D gate driving voltage 3D_Von decreases to the reference voltage Vref during the 2D mode, and the decreased voltage is output as the 2D gate driving voltage 2D_Von. In the 2D mode, the length of the high period of each gate signal G1~Gn is larger than the length of the high period of each gate signal G1~Gn in the 3D mode. Accordingly, the 2D gate driving voltage 2D_Von is preferably decreased to the reference voltage Vref.

Figure 11:
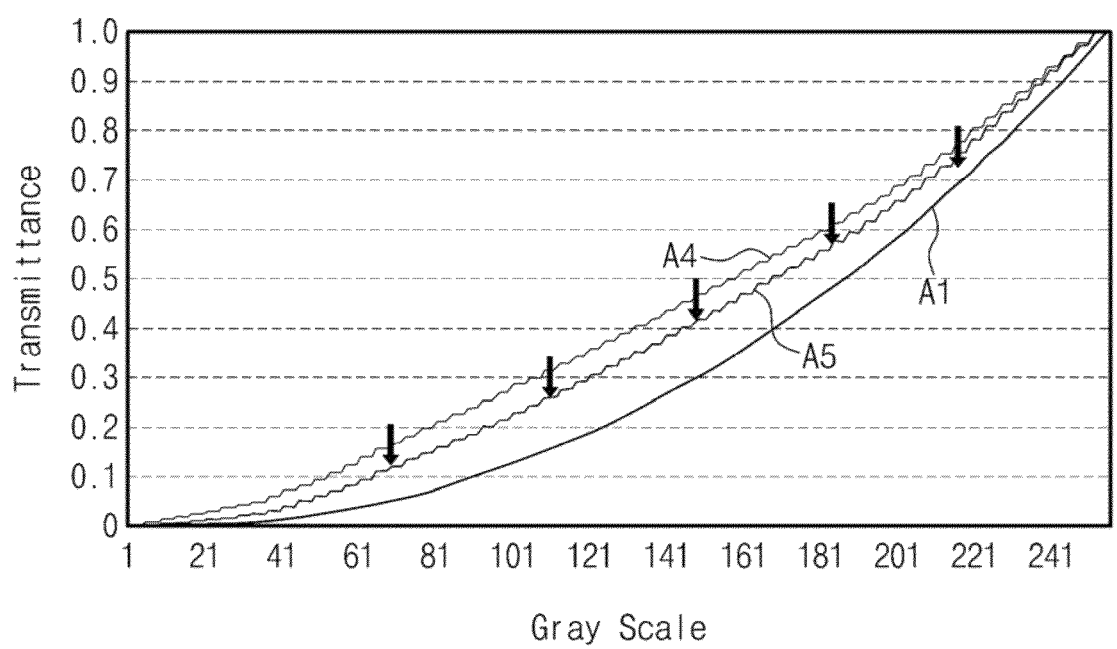
FIG. 11 is a graph showing a variation of a gamma curve according to a voltage level of a gate driving voltage.

FIG. 11 is a graph showing a variation of a gamma curve according to a voltage level of a gate driving voltage. In FIG. 11, a first graph A1 shows a 2.2 gamma curve, a fourth graph A4 shows a gamma curve when the 3D gate driving voltage 3D_Von is about 22 volts, and a fifth graph A5 shows a gamma curve when the 3D gate driving voltage 3D_Von is about 28 volts.

Referring to FIGS. 9 and 11, as the 3D gate driving voltage 3D_Von increases from about 22 volts to about 28 volts, the gamma curve A4 of the 3D image signals when the 3D gate driving voltage is about 22 volts is transformed to the gamma curve A5 of the 3D image signals when the 3D gate driving voltage is about 28 volts, thereby approaching the 2.2 gamma curve A1. Consequently, the frame change rate is improved as the 3D gate driving voltage 3D_Von increases above the reference voltage Vref, so that the gamma value of the 3D image signals may be compensated.

Figure 12:
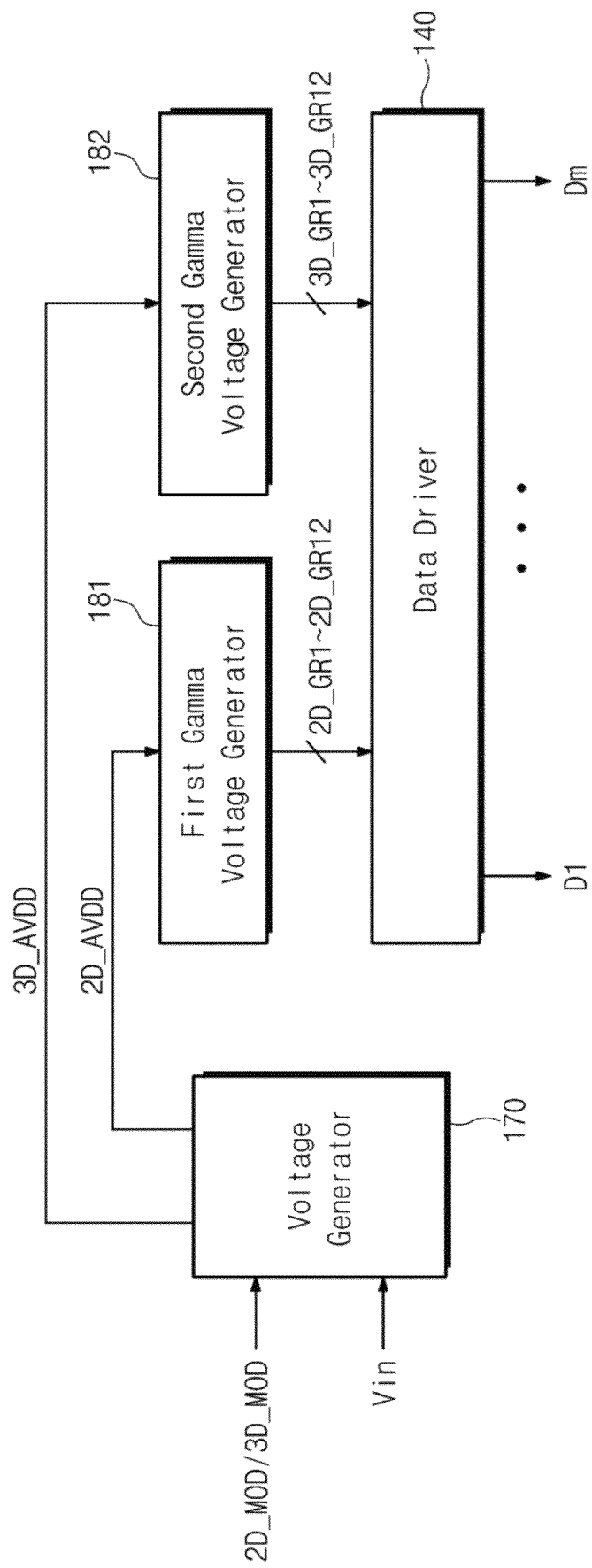
FIG. 12 is a block diagram showing a data driver, first and second gamma voltage generators, and a voltage generator according to another exemplary embodiment of the present invention.

FIG. 12 is a block diagram showing a data driver, first and second gamma voltage generators, and a voltage generator according to another exemplary embodiment of the present invention.

Referring to FIG. 12, the voltage generator 170 receives the input voltage Vin and the first mode signal 3D_MOD or the second mode signal 2D_MOD from the detector 125 shown in FIG. 1. The voltage generator 170 generates a first analog driving voltage 2D_AVDD in response to the second mode signal 2D_MOD during the 2D mode, and the voltage generator 170 generates a second analog driving voltage 3D_AVDD higher than the first analog driving voltage 2D_AVDD in response to the first mode signal 3D_MOD.

According to an exemplary embodiment, the first analog driving voltage 2D_AVDD may be set to about 8 volts, and the second analog driving voltage 3D_AVDD may be set to about 8.77 volts.

The first gamma voltage generator 181 receives the first analog driving voltage 2D_AVDD to output first gamma reference voltages 2D_GR1~2D_GR12. The second gamma voltage generator 182 receives the second analog driving voltage 3D_AVDD to output second gamma reference voltages 3D_GR1~3D_GR12 higher than the first gamma reference voltages 2D_GR1~2D_GR12.

Figure 13A:
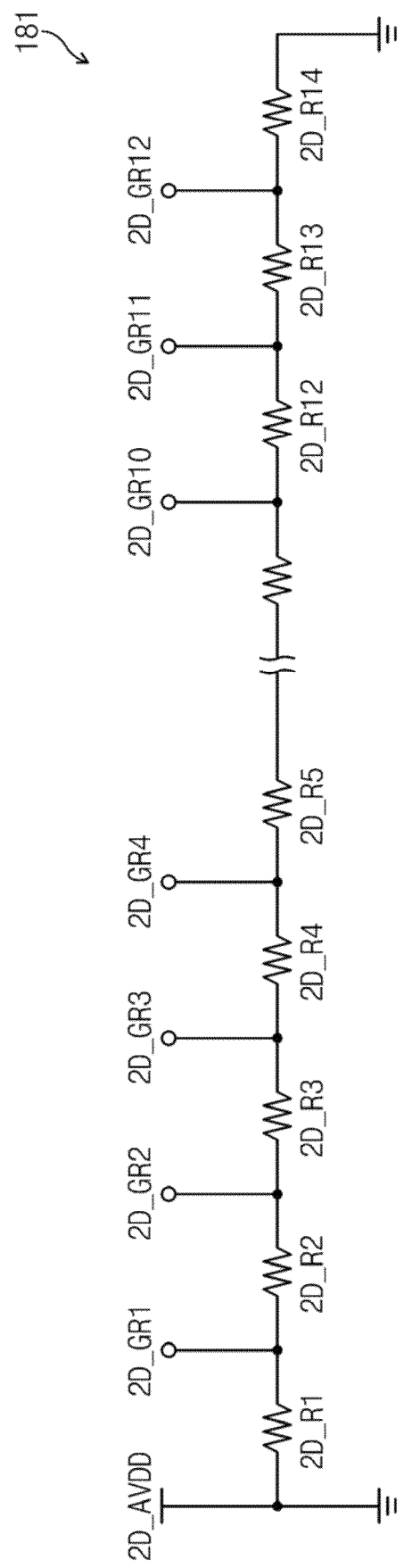
FIG. 13A is a circuit diagram showing a first gamma voltage generator of FIG. 12.
Figure 13B:
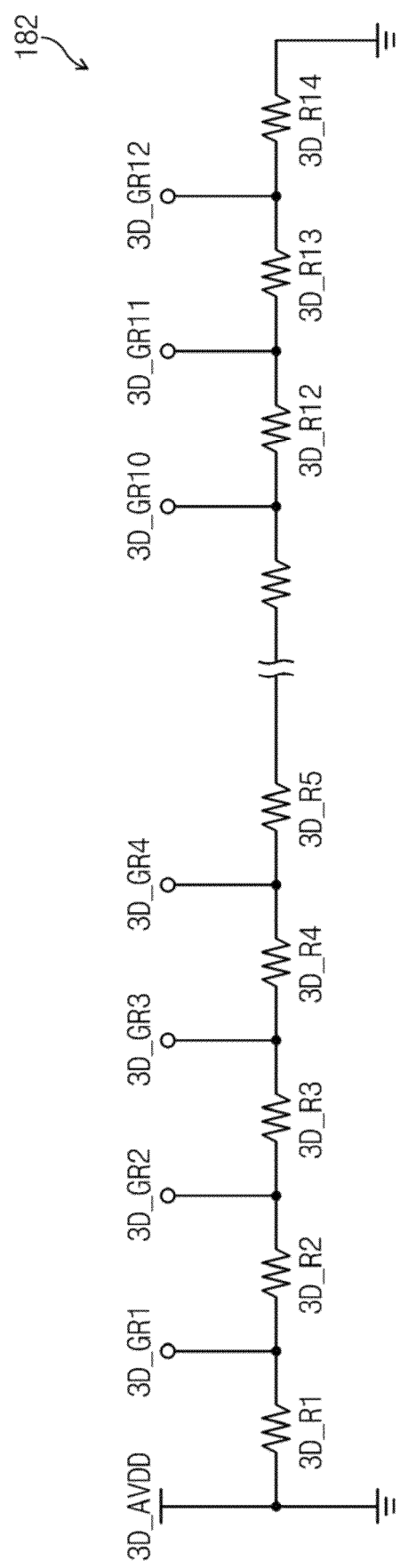
FIG. 13B is a circuit diagram showing a second gamma voltage generator of FIG. 12.

FIG. 13A is a circuit diagram showing the first gamma voltage generator 181 of FIG. 12, and FIG. 13B is a circuit diagram showing a second gamma voltage generator 182 of FIG. 12.

Referring to FIG. 13A, the first gamma voltage generator 181 has a resistor-string structure including a plurality of 2D resistors 2D_R1~2D_R14 connected between the first analog driving voltage 2D_AVDD and a ground voltage in series. The first gamma voltage generator 181 outputs electric potentials at nodes, wherein each node is connection between two adjacent resistors, as the first gamma reference voltages 2D_GR1~2D_GR12.

Referring to FIG. 13B, the first gamma voltage generator 182 has a resistor-string structure including a plurality of 3D resistors 3D_R1~3D_R14 connected between the second analog driving voltage 3D_AVDD and the ground voltage in series. The second gamma voltage generator 182 outputs electric potentials at nodes, wherein each nodes is connected between two adjacent resistors, as the second gamma reference voltages 3D_GR1~3D_GR12.

Each of the 3D resistors 3D_R1~3D_R14 has a resistance smaller than that of each of the 2D resistors 2D_R1~2D_R14. Thus, each of the second gamma reference voltages 3D_GR1~3D_GR12 may not have a voltage level higher than that of each of the first gamma reference voltages 2D_GR1~2D_GR12.

In FIGS. 13A and 13B, circuit configurations output twelve gamma reference voltages from each of the first and second gamma voltage generators 181 and 182, but the number of the gamma reference voltages is not limited thereto.

Referring to FIG. 12 again, the data driver 140 receives the first gamma reference voltages 2D_GR1~2D_GR12 from the first gamma voltage generator 181 during the 2D mode, and the data driver 140 receives the second gamma voltage generator 182 from the second gamma voltage generator 182 during the 3D mode.

Accordingly, although the data driver 140 receives the image signals having the same gray scale in both 2D and 3D modes, the data driver 140 may output the data voltages in the 3D mode, which are higher than those in the 2D mode. As described above, the voltage level of the data voltages respectively applied to the pixels during the 3D mode increases, thereby improving the frame change rate of each pixel.

Figure 14:
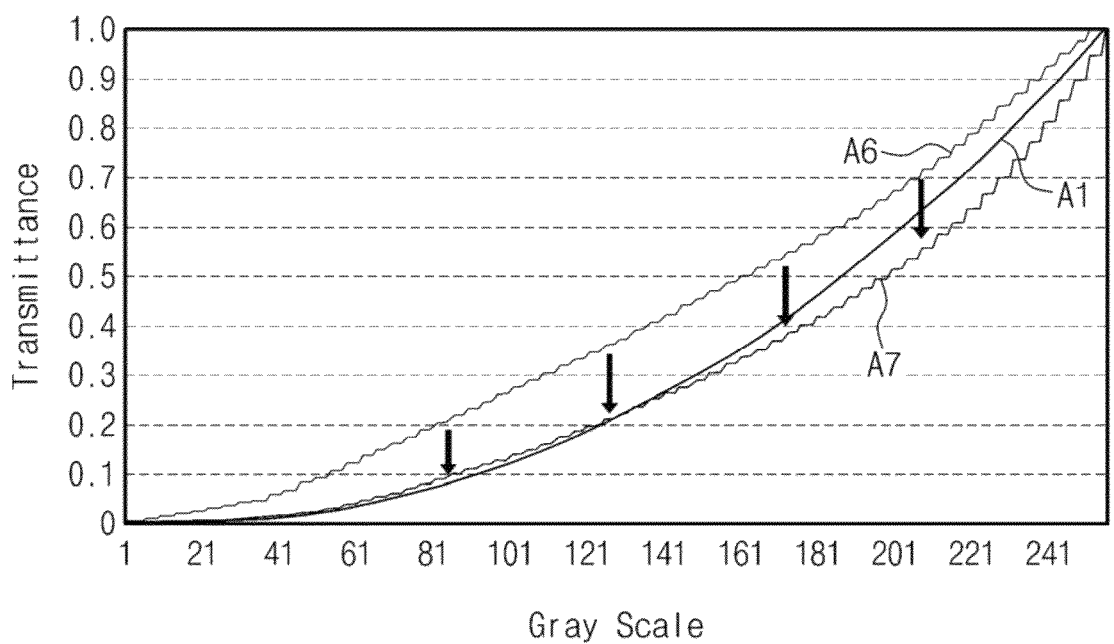
FIG. 14 is a graph showing a variation of a gamma curve according to a voltage level of an analog driving voltage.

FIG. 14 is a graph showing a variation of a gamma curve according to a voltage level of an analog driving voltage. In FIG. 14, a first graph A1 shows a 2.2 gamma curve, a sixth graph A6 shows a gamma curve when applying an analog driving voltage of about 8 volts during the 3D mode, and a seventh graph A7 shows a gamma curve when applying an analog driving voltage of about 8.77 volts during the 3D mode.

Referring to FIG. 14, if the gamma reference voltages are generated using the analog driving voltage of about 8 volts in the conventional 3D mode, the gamma value of the 3D image signals is lowered to less than 2.2. However, when the analog driving voltage increases to about 8.77 volts in the 3D mode, the gamma curve is closer to the 2.2 gamma curve than that in the conventional 3D mode. That is, the gamma value of the 3D image signals may be increased by increasing the analog driving voltage to 8.77 volts.

Referring to FIGS. 7 to 14, various methods for compensating for the frame change rate of each pixel in the 3D mode have been described. The display apparatus 100 may compensate for the frame change rate by using one of those methods, but is not limited thereto. That is, the display apparatus 100 may compensate for the frame change rate by using one or more methods among the described methods.

Hereinafter, a display apparatus 200 that is configured to use the above methods will be described with reference to FIG. 15.

Figure 15:
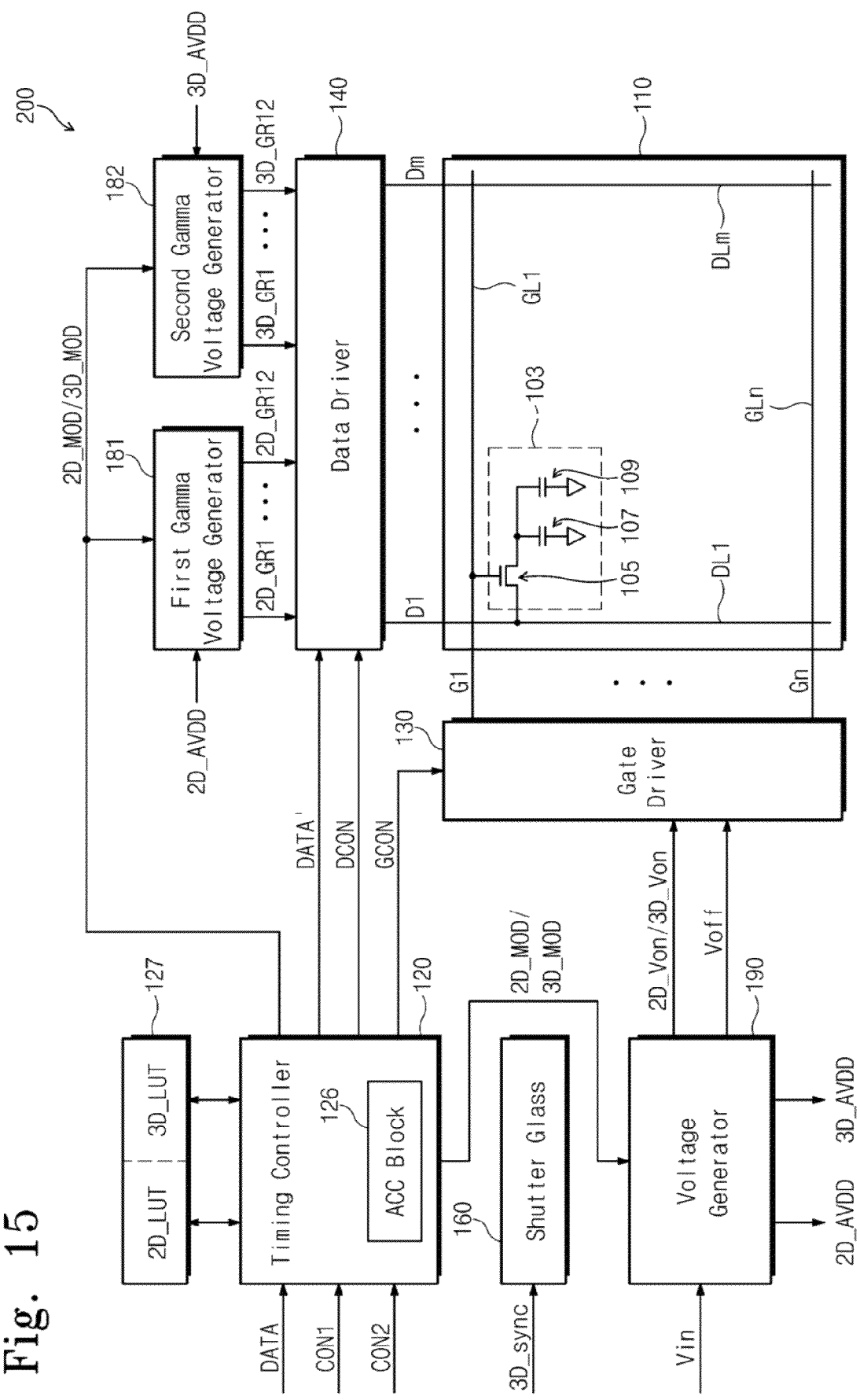
FIG. 15 is a block diagram showing a display apparatus according to another exemplary embodiment of the present invention.

FIG. 15 is a block diagram showing a display apparatus according to another exemplary embodiment of the present invention. In FIG. 15, the same reference numerals denote the same elements in FIG. 1, and thus detailed descriptions of the same elements will be omitted.

Referring to FIG. 15, a display apparatus 200 includes a display panel 110, a timing controller 120, a gate driver 130, a data driver 140, a shutter glass 160, a voltage generator 190, a first gamma voltage generator 181, and a second gamma voltage generator 182.

The timing controller 120 includes an ACC block 126. The ACC block 126 compensates for the 3D image signals with reference to a first look-up table 3D_LUT in response to a first mode signal 3D_MOD and compensates for the 2D image signals with reference to a second look-up table 2D_LUT in response to a second mode signal 2D_MOD. The first look-up table 3D_LUT stores 3D compensation values and the second look-up table 2D_LUT stores 2D compensation values.

Accordingly, since the ACC block 126 compensates for the 3D image signals using the 3D compensation values in the 3D mode, the ACC block 126 may compensate for the gamma value of the 3D image signals. In addition, since the ACC block 126 compensates for the 2D image signals using the 2D compensation values in the 2D mode, the gamma value increased in the 3D mode may be decreased to a normal gamma value (e.g., 2.2 gamma value) in the 2D mode.

The voltage generator 190 outputs the 3D gate driving voltage 3D_Von and the 3D analog driving voltage 3D_AVDD in response to the first mode signal 3D_MOD provided from the timing controller 120 during the 3D mode. In addition, the voltage generator 190 outputs the 2D gate driving voltage 2D_Von and the 2D analog driving voltage 2D_AVDD in response to the second mode signal 2D_MOD provided from the timing controller 120 during the 2D mode. The 3D gate driving voltage 3D_Von and the 3D analog driving voltage 3D_AVDD have a voltage level higher than the 2D gate driving voltage 2D_Von and the 2D analog driving voltage 2D_AVDD. According to an exemplary embodiment, the voltage generator 190 may be a DC-DC converter.

The gate driver 130 sequentially outputs the gate signals G1~Gn having a size corresponding to the 3D gate driving voltage 3D_Von during the 3D mode and sequentially outputs the gate signals G1~Gn having a size corresponding to the 2D gate driving voltage 2D_Von during the 2D mode.

The first gamma voltage generator 181 receives the 2D analog driving voltage 2D_AVDD to output the first gamma reference voltages 2D_GR1~2D_GR12, and the second gamma voltage generator 182 receives the 3D analog driving voltage 3D_AVDD to output the second gamma reference voltages 3D_GR1~3D_GR12 higher than the first gamma reference voltages 2D_GR1~2D_GR12.

The data driver 140 receives the first gamma reference voltages 2D_GR1~2D_GR12 from the first gamma voltage generator 181 during the 2D mode and receives the second gamma reference voltages 3D_GR1~3D_GR12 from the second gamma voltage generator 182 during the 3D mode.

Accordingly, although the data driver 140 receives the image signals having the same gray scale in both 2D and 3D modes, the data driver 140 may output the data voltages in the 3D mode, which are higher than those in the 2D mode. As described above, since the voltage level of the data voltages respectively applied to the pixels during the 3D mode increases, the frame change rate of each pixel may be improved.

Although exemplary embodiments of the present invention have been described, it is understood that the present invention should not be limited to exemplary embodiments but various changes and modifications can be made by one ordinary skilled in the art within the spirit and scope of the present invention as hereinafter claimed.

What is claimed is:

1. A display apparatus comprising:
   a timing controller that receives a first image signal of a first perspective and a second image signal of a second perspective in synchronization with a first control signal during a three-dimensional (3D) mode and receives a two-dimensional (2D) image signal, in synchronization with a second control signal during a 2D mode;
   a data driver that converts the first image signal to a first data voltage and the second image signal to a second data voltage to alternately output the first and second data voltages in one frame unit during the 3D mode and converts the 2D image signal to a third data voltage to output the third data voltage in one frame unit during the 2D mode;
   a detector that determines whether the timing controller is operated in the 3D mode or the 2D mode based on the first and second control signals and outputs a first mode signal or a second mode signal to the timing controller according to a result of the determination;
   a display panel that alternately displays an image of the first image signal corresponding to the first data voltage and an image of the second image signal corresponding to the second data voltage in one frame unit during the 3D mode and displays a 2D image corresponding to the third data voltage during the 2D mode;
   a gate driver that generates a gate driving voltage as a gate si al and provides the gate driving voltage to the display panel; and
   a voltage generator that increases the gate driving voltage higher than a reference voltage in response to the first mode signal and decreases the increased gate driving voltage to the reference voltage in response to the second mode signal.

2. The display apparatus of claim 1, wherein the first control signal comprises a plurality of successive frame periods each having a first enable period in which a high period and a low period are periodically and repeatedly generated and a first blank period in which only the low period is generated, the second control signal comprises a plurality of successive frame periods each having a second enable period in which a high period and a low period are periodically and repeatedly generated and a second blank period in which only the low period is generated, he first blank period is longer than the second blank period, and the high period of the second enable period is longer than the high period of the first enable period.

3. The display apparatus of claim 2,
   further comprising shutter glasses comprising a left-eye shutter and a right-eye shutter that are closed during the first enable period and opened during the first blank period in synchronization with the first control signal, and
   wherein the left-eye shutter and the right-eye shutter are alternately opened in one frame unit.

4. The display apparatus of claim 2, wherein the detector comprises:
   a counter that counts the high period of the first control signal with a predetermined reference clock in response to the first control signal and counts the high period of the second control signal with the reference clock in response to the second control signal;
   a comparator that compares the count value with a predetermined reference value; and
   a mode signal outputter that outputs the first mode signal by recognizing the 3D mode when the count value is smaller than the reference value and outputs the second mode signal by recognizing the 2D mode when the count value is equal to or larger than the reference value.

5. The display apparatus of claim 1, wherein the timing controller comprises:
   a first look-up table that stores a first compensation value for the 3D mode;
   a second look-up table that stores a second compensation value for the 2D mode; and
   a color compensation block that compensates for a color of the first and second image signals with the first compensation value in response to the first mode signal and compensates for a color of the 2D image signal with the second compensation value in response to the second mode signal, and the first compensation value is greater than the second compensation value under a same gray scale.

6. The display apparatus of claim 1, further comprising:
   a first gamma voltage generator that generates a first gamma reference voltage in response to the second mode signal during the 2D mode and provides the first gamma reference voltage to the data driver; and
   a second gamma voltage generator that generates a second gamma reference voltage higher than the first gamma reference voltage in response to the first mode signal during the 3D mode and provides the second gamma reference voltage to the data driver.

7. The display apparatus of claim 6, further comprising a voltage generator that generates a first analog driving voltage in response to the second mode signal to provide the first analog driving voltage to the first gamma voltage generator and generates a second analog driving voltage higher than the first analog driving voltage in response to the first mode signal to provide the second analog driving voltage to the second gamma voltage generator.

8. A display apparatus comprising:
   a timing controller that outputs a first image signal for a left-eye perspective and a second image signal for a right-eye perspective during a three-dimensional (3D) mode and outputs a two-dimensional (2D) image signal during a 2D mode;
   a data driver that converts the first image signal to a first data voltage and the second image signal to a second data voltage to alternately output the first and second data voltages in one frame unit during the 3D mode and converts the 2D image signal to a data voltage to output the data voltage in one frame unit during the 2D mode;

a display panel that alternately displays a left-eye image of the first image signal corresponding to the first data voltage and a right-eye image of the second image signal corresponding to the second data voltage in one frame unit during the 3D mode and displays a 2D image corresponding to the data voltage during the 2D mode;

a compensator that compensates for a gamma value of the left-eye image and the right-eye image to be increased when the 2D mode is converted to the 3D mode and compensates for an increased gamma value to be decreased to the gamma value of the 2D image when the 3D mode is converted to the 2D mode;

a gate driver that generates a gate driving voltage as a gate signal and provides the gate driving voltage to the display panel; and a voltage generator that increases the gate driving voltage higher than a reference voltage in response to the first mode signal and decreases the increased gate driving voltage to the reference voltage in response to the second mode signal.

9. The display apparatus of claim 8, wherein the compensator comprises:
a first look-up table that stores a first compensation value for the 3D mode;
a second look-up table that stores a second compensation value for the 2D mode; and
a color compensation block that compensates for a color of the first and second image signals with the first compensation value during the 3D mode and compensates for a color of the 2D image signal with the second compensation value during the 2D mode, and the first compensation value is greater than the second compensation value under a same gray scale.

10. The display apparatus of claim 8, wherein the compensator further comprises:
a voltage generator that generates a first analog driving voltage in the 2D mode and generates a second analog driving voltage higher than the first analog driving voltage in the 3D mode;
a first gamma voltage generator that receives the first analog driving voltage in the 2D mode and generates a first gamma reference voltage to provide the first gamma reference voltage to the data driver; and
a second gamma voltage generator that receives the second analog driving voltage in the 3D mode and generates a second gamma reference voltage higher than the first gamma reference voltage to provide the second gamma reference voltage to the data driver.

11. A method of driving a display apparatus, comprising:
receiving a first image signal of a first perspective and a second image signal of a second perspective in synchronization with a first control signal during a three-dimensional (3D) mode and receiving a two-dimensional (2D) image signal in synchronization with a second control signal during a 2D mode;
outputting a 3D mode signal or a 2D mode signal based on the first and second control signals;
compensating for a gamma value of the first and second image signals in response to the 3D mode signal such that the gamma value is increased;
converting the compensated first image signal and the compensated second image signals to a first data voltage and a second data voltage, respectively, to alternately output the first and second data voltages in one frame unit;
displaying alternately a left-eye image of the first image signal corresponding to the first data voltage and a right-eye image of the second image signal corresponding to the second data voltage in one frame unit during the 3D mode;
decreasing an increased gamma value to a gamma value corresponding to the 2D image signal in response to the 2D mode signal;
converting the 2D image signal to a data voltage in one frame unit to output the data voltage;
displaying a 2D image corresponding to the data voltage during the 2D mode;
generating a gate driving voltage as a gate signal to provide the date driving voltage to the display panel,
wherein the gate driving voltage has a voltage level higher than a reference voltage according to the first mode signal and has a same voltage level as the reference voltage according to the second mode signal.

12. The method of claim 11,
wherein the first control signal comprises a plurality of successive frame periods each having a first enable period in which a high period and a low period are periodically and repeatedly generated and a first blank period in which only the low period is generated, the second control signal comprises a plurality of successive frame periods each having a second enable period in which a high period and a low period are periodically and repeatedly generated and a second blank period in which only the low period is generated, the first blank period is longer than the second blank period, and the high period of the second enable period is longer than the high period of the first enable period.

13. The method of claim 12, further comprising alternately opening a left-eye shutter and a right-eye shutter of shutter glasses in one frame unit in synchronization with the first control signal, and wherein each of the left-eye shutter and the tight-eye shutter is closed in the first enable period and opened in the first blank period.

14. The method of claim 12, wherein the outputting of the 3D mode signal or the 2D mode signal comprises:
counting one high period of the first control signal with a predetermined reference clock when the first control signal is input and counting one high period of the second control signal with the reference clock when the second control signal is input;
comparing a count value with a predetermined reference value; and
outputting the 3D mode signal by recognizing the 3D mode when the count value is smaller than the reference value and outputting the 2D mode signal by recognizing the 2D mode when the count value is equal to or larger than the reference value.

15. The method of claim 11, wherein the compensating of the gamma value of the first and second image signals comprises compensating a color of the first and second image signals with a first compensation value for the 3D mode, and the decreasing of the increased gamma value comprises compensating a color of the 2D image signal with a second compensation value for the 2D, and the first compensation value is greater than the second compensation value under a same gray scale.

* * * * *